United States Patent
Coignet et al.

(10) Patent No.: US 10,525,400 B2
(45) Date of Patent: Jan. 7, 2020

(54) SORBENT-LOADED BEADS FOR HIGH TEMPERATURE ADSORPTION PROCESSES

(71) Applicants: L'Air Liquide, Societe Anonyme pour l'Etude et l'Exploitation des Procedes Georges Claude, Paris (FR); AIR LIQUIDE ADVANCED TECHNOLOGIES U.S. LLC, Houston, TX (US)

(72) Inventors: Philippe A. Coignet, Bear, DE (US); Dean W. Kratzer, Warwick, MD (US); Sudhir S. Kulkarni, Wilmington, DE (US); Edgar S. Sanders, Jr., Newark, DE (US)

(73) Assignees: L'Air Liquide Societe Anonyme Pour L'Etude Et L'Exploitation Des Procedes Georges Claude, Paris (FR); Air Liquide Advanced Technologies U.S. LLC, Houston, TX (US)

( * ) Notice: Subject to any disclaimer, the term of this patent is extended or adjusted under 35 U.S.C. 154(b) by 0 days.

(21) Appl. No.: 15/858,865

(22) Filed: Dec. 29, 2017

(65) Prior Publication Data

US 2018/0296967 A1  Oct. 18, 2018

Related U.S. Application Data

(63) Continuation-in-part of application No. 15/396,644, filed on Apr. 17, 2017, now Pat. No. 10,315,184.

(51) Int. Cl.

| | |
|---|---|
| *B01D 53/04* | (2006.01) |
| *B01J 20/26* | (2006.01) |
| *B01J 20/18* | (2006.01) |
| *B01J 20/28* | (2006.01) |
| *B01J 20/20* | (2006.01) |
| *B01J 20/10* | (2006.01) |
| *B01J 20/30* | (2006.01) |
| B01D 53/047 | (2006.01) |

(52) U.S. Cl.
CPC ........ *B01D 53/0407* (2013.01); *B01J 20/103* (2013.01); *B01J 20/18* (2013.01); *B01J 20/20* (2013.01); *B01J 20/262* (2013.01); *B01J 20/2803* (2013.01); *B01J 20/28011* (2013.01); *B01J 20/3078* (2013.01); *B01D 53/047* (2013.01); *B01D 53/0462* (2013.01); *B01D 53/0476* (2013.01); *B01D 2253/102* (2013.01); *B01D 2253/104* (2013.01); *B01D 2253/106* (2013.01); *B01D 2253/108* (2013.01); *B01D 2253/116* (2013.01); *B01D 2253/202* (2013.01); *B01D 2253/204* (2013.01); *B01D 2253/25* (2013.01); *B01D 2253/34* (2013.01); *B01D 2256/10* (2013.01); *B01D 2256/12* (2013.01); *B01D 2256/245* (2013.01); *B01D 2257/102* (2013.01); *B01D 2257/104* (2013.01); *B01D 2257/504* (2013.01); *B01D 2257/80* (2013.01)

(58) Field of Classification Search
CPC .... B01D 53/04; B01D 53/0407; B01J 20/103; B01J 20/18; B01J 20/20; B01J 20/262
USPC ...................................................... 502/401
See application file for complete search history.

(56) References Cited

U.S. PATENT DOCUMENTS

| | | |
|---|---|---|
| 5,139,668 A | 8/1992 | Pan et al. |
| 5,401,706 A | 3/1995 | Fischer |
| 5,693,230 A | 12/1997 | Asher |
| 6,451,723 B1 | 9/2002 | Gaita et al. |
| 6,500,233 B1 | 12/2002 | Miller et al. |
| 6,592,651 B2 | 7/2003 | Jain et al. |
| 7,077,891 B2 | 7/2006 | Jaffe et al. |
| 7,592,284 B2 | 9/2009 | Zaki et al. |
| 8,133,308 B2 | 3/2012 | Lively et al. |
| 8,257,474 B2 | 9/2012 | Lively et al. |
| 8,377,172 B2 | 2/2013 | Koros et al. |
| 8,673,059 B2 | 3/2014 | Leta et al. |
| 9,050,582 B2 | 6/2015 | Barrett et al. |
| 9,446,344 B2 | 9/2016 | Koch et al. |
| 2010/0313755 A1 | 12/2010 | Koros et al. |
| 2012/0048109 A1 | 3/2012 | Chinn et al. |
| 2012/0247330 A1 | 10/2012 | Chang et al. |
| 2013/0255488 A1 | 10/2013 | Chang et al. |
| 2013/0305920 A1 | 11/2013 | Yang et al. |
| 2013/0340620 A1 | 12/2013 | Sundaram |

FOREIGN PATENT DOCUMENTS

| | | |
|---|---|---|
| EP | 1 323 468 | 7/2003 |
| FR | 3 002 939 | 9/2014 |
| WO | WO 2012 118 759 | 9/2012 |

OTHER PUBLICATIONS

Akhtar, et al., "Structuring adsorbents and catalysts by processing of porous powders," Journal of the European Ceramic Society, 34 (2014), pp. 1643-1666.
Bhandari, et al., "Dual layer hollow fiber sorbents: Concept, fabrication and characterization," Separation and Purification Technology, 104 (2013), pp. 68-80.
Jeffs, et al., "A polymer of intrinsic microporosity as the active binder to enhance adsorption/separation properties of composite hollow fibres," Microporous and Mesoporous Materials, 170 (2013), pp. 105-112.
Labreche, "Post-spinning infusion of poly(ethyleneimine) into polymer/silica hollow fiber sorbents for carbon dioxide capture,"Chemical Engineering Journal, 221 (2013), pp. 166-175.
Lively, et al., "CO2 sorption and desorption performance of thermally cycled hollow fiber sorbents," International Journal of Greenhouse Gas Control, 10 (2012), pp. 285-294.
Lively, et al., "Hollow Fiber Adsorbents for CO2 Removal from Flue Gas," Ind. Eng. Chem. Res., vol. 48, No. 15, 2009, pp. 7314-7324.
Thiruvenkatachari, et al., "Post combustion CO2 capture by carbon fibre monolithic adsorbents," Progress in Energy and Combustion Science, 35 (2009), pp. 438-455.
International Search Report and Written Opinion for PCT/US2017/069059, dated Apr. 6, 2018.

*Primary Examiner* — Edward M Johnson

(74) *Attorney, Agent, or Firm* — Christopher J. Cronin

(57) ABSTRACT

A plurality of extrudates comprises sorbent particles (at 50 wt %) in a polymeric matrix that comprises a polymer or blend of polymers including at least one thermoplastic polymer, the extrudates being produced by thermal-induced phase separation or diffusion-induced phase separation from a dope suspension of the thermoplastic polymer, an optional solvent and the sorbent particles. The polymer or blend of polymers is able to withstand exposure to temperatures at or above 220° C. without experiencing significant detrimental effects upon the sorbent capacity of the sorbent particles.

42 Claims, 2 Drawing Sheets

SORBENT-LOADED BEADS FOR HIGH TEMPERATURE ADSORPTION PROCESSES

CROSS-REFERENCE TO RELATED APPLICATIONS

This is a Continuation-In-Part of Non-Provisional application 15/396,644 originally filed on Dec. 31, 2016 and later accorded a filing date of Apr. 17, 2017.

BACKGROUND

Field of the Invention

The present invention relates to structured adsorbents for gas separation.

Related Art

Adsorbents are typically shaped as small beads (1-5 mm in diameter) and find widespread use in countless applications, from desiccants for insulated windows to hydrogen purification. Current adsorbent systems, however, include a number of drawbacks.

The packing density of a traditional beaded adsorbent bed is limited by the generally spherical shape of the beads. Specifically, the maximum packing density achievable with perfect spheres of identical diameter is 74%. In reality, within a bed of adsorbent beads a distribution of diameters exists. For example, a ratio of the largest diameter to the smallest diameter is may be around 2:1. Also, beads are not necessarily perfectly spherical, so that often, an average packing density of only as much as 65% is achieved.

Because current beaded adsorbent typically use brittle, clay-based binders, such as bentonite, they are intolerant to friction or impacts and consequently are prone to dusting. Given that current beaded adsorbents are typically intolerant to friction and impacts, it is standard practice to limit the gas velocity seen by the average bead to anywhere between 80 and 90% of the fluidization velocity so that fluidization and dusting are avoided. Because the gas velocity is limited, the flow rates of gas during production and depressurization steps are similarly limited. If the flow rates are limited, the speed at which an adsorbent bed can be depressurized and repressurized is also limited. This is especially true for large PSA systems. Therefore, the throughput of conventional beaded adsorbent beds is limited.

The attrition velocity is an indicator of the maximum gas velocity that the beads of conventional adsorbent beds can be subjected to without exhibiting attrition (i.e., dusting) due to friction and impacts. The attrition velocity is directly linked to the average bead-mass. As the bead mass increases, the attrition velocity increases. Therefore, one way to increase the throughput of a beaded adsorbent bed is to increase the mass of the average bead, or to put it another way, to increase the average diameter of the beads. However, increasing the mass or average diameter of the beads comes at the expense of slower kinetics due to diffusion limitations of gas transport within the beads. This is because, as the mass/diameter of a bead increases, the average path length traveled by a plug of gas from the surface of a bead to an available adsorption site within the bead will also increase.

In order to mitigate some of the above-described drawbacks, some have proposed the use of structured adsorbent beds. As opposed to the discrete structure of a beaded bed, the concept of structured adsorbent bed is to form a rigid and/or fixed adsorbent bed or continuous adsorbent structure so as to eliminate the issues related to fluidization. By doing so, the kinetics can be improved by decreasing the characteristic dimension of the adsorbent structure. As an example, a supported adsorbent layer only 0.1 mm thick can have better kinetics than a similar mass of adsorbent configured as 2 mm beads.

One type of structured adsorbent beds proposed is formed by depositing an adsorbent-containing layer onto a non-absorbent substrate (e.g., an aluminum framework). Commercially available desiccant wheels are a prime example of this approach as described in U.S. Pat. No. 5,401,706. Alternatively, U.S. Pat. No. 8,133,308 proposes a supported sorbent fiber. Specifically, a thin layer of a matrix including adsorbent and cellulose acetate is deposited around the outside diameter of a non-sorbent hollow fiber.

Although kinetics can be improved in structured adsorbent beds using substrate-supported adsorbents, the approach suffers several drawbacks. A first drawback is the cost as more manufacturing steps are involved. A second drawback is a lower effective adsorbent packing density because the space occupied by the support/substrate does not significantly participate in the adsorption process.

Alternatively, adsorbents made of a mixed-matrix of adsorbent/polymer have been proposed in order to increase the packing density. For instance, U.S. Pat. No. 6,451,723 discloses the use of polysulfone (PS) to form mixed-matrix 13X-PS adsorbent structures. Although polymeric binders are preferable to brittle clay-based (or similar brittle binders) for ease of bed forming and handling as well as resistance to mechanical and thermal stress, we are not aware of any thermoplastic polymeric binder-based adsorbents that are fully satisfactory when high temperature activation and/or regeneration are required. More specifically, many common adsorbents can require activation/regeneration temperatures well above 200° C. For example, 5A and 13X zeolites as well as activated alumina can require activation temperatures in excess of 300° C., lithium-based zeolites can require activation temperatures in excess of 400° C., and activated carbon or carbon molecular sieve (CMS) adsorbents can require activation temperatures in excess of even 450° C.

Such high activation temperatures may be necessary in order to reach the full adsorbent capacity for the targeted gas. For example, considering a temperature swing adsorption (TSA) system in a front end purification unit of an air separation unit (ASU), 13X zeolite adsorbent can be used to remove $CO_2$ from air after $H_2O$ removal and prior to sending the purified air stream to the cryogenic part of the process. In order to desorb $H_2O$ molecules from the 13X zeolite, on-site activation of the adsorbent at a temperature of around 300° C. is initially performed. Subsequently, assuming that there is no subsequent contamination of the zeolite by water molecules, lower regeneration temperatures are sufficient to desorb $CO_2$ molecules as part of the normal TSA operation. During the life of the adsorbent within the TSA, periodic regenerations around 300° C. may be performed on-site, such as after a shutdown or upon early $CO_2$ breakthrough.

Therefore, in order to take advantage of all of the benefits brought by polymeric binders, there is a need to develop new formulations for an adsorbent-polymer matrix that can sustain high temperature activation/regeneration.

SUMMARY

There is disclosed a bed of composite extrudates for sorbent-based fluid separations each of which comprises sorbent particles in a polymeric matrix, wherein: the polymeric matrix comprises a polymeric binder or blend of polymeric binders; the polymeric binder or blend of polymeric binders comprises at least one thermoplastic polymer; the polymeric binder or blend of polymeric binders is able to withstand exposure to temperatures at or above 220° C. without significant detrimental effect upon the sorbent capacity of the sorbent particles; said extrudates having been produced by temperature-induced phase separation (TIPS) or diffusion-induced phase inversion (DIPS) from a polymer dope suspension that comprises the thermoplastic polymer, optionally dissolved in a solvent in the case of DIPS, and the sorbent particles either suspended in the solvent in the case of DIPS or suspended in thermoplastic polymer while in the molten state in the case of TIPS; the sorbent is an adsorbent or absorbent; and the sorbent particles are present in the extrudates at a concentration of at least 50 wt %.

There is also disclosed a method for activation of the above-disclosed extrudates comprising the step of heating the extrudates to a predetermined activation temperature of the sorbent.

There is also disclosed an adsorbent bed for adsorption-based fluid separations comprising a plurality of the extrudates activated by the above-disclosed activation method.

There is also disclosed a method for adsorption-based gas separation, comprising the step of separating a feed gas, including at least first and second gases, with one or more of the adsorbent beds of claim 35 to produce a first stream of gas that is enriched in the first gas in comparison to the feed gas and a second stream of gas that is enriched in the second gas in comparison to the feed gas, wherein the feed gas is separated by said one or more adsorbent beds by pressure swing adsorption, pressure-temperature swing adsorption, temperature swing adsorption, vacuum swing adsorption, vacuum-pressure swing adsorption, or electro swing adsorption.

Any one or more of the above-disclosed extrudates or methods may include one or more of the following aspects:

the polymeric binder or blend of polymeric binders has a Vicat softening temperature or a heat deflection temperature of at least 220° C.

the polymeric binder or blend of polymeric binders has a Vicat softening temperature or a heat deflection temperature of at least 240° C.

the polymeric binder or blend of polymeric binders has a Vicat softening temperature or a heat deflection temperature of at least 250° C.

the polymeric binder or blend of polymeric binders has a Vicat softening temperature or a heat deflection temperature of at least 270° C.

the polymeric binder or blend of polymeric binders has a Vicat softening temperature or a heat deflection temperature of at least 300° C.

the polymeric binder or blend of polymeric binders has a Vicat softening temperature or a heat deflection temperature of at least 330° C.

the polymeric binder or blend of polymeric binders has a Vicat softening temperature or a heat deflection temperature of at least 360° C.

the polymeric binder or blend of polymeric binders has a Vicat softening temperature or a heat deflection temperature of at least 400° C.

the polymeric binder or blend of polymeric binders has a glass transition temperature(s) of at least 220° C.

the polymeric binder or blend of polymeric binders has a glass transition temperature(s) of at least 240° C.

the polymeric binder or blend of polymeric binders has a glass transition temperature(s) of at least 250° C.

the polymeric binder or blend of polymeric binders has a glass transition temperature(s) of at least 260° C.

the polymeric binder or blend of polymeric binders has a glass transition temperature(s) of at least 270° C.

the polymeric binder or blend of polymeric binders has a glass transition temperature(s) of at least 300° C.

the polymeric binder or blend of polymeric binders has a glass transition temperature(s) of at least 330° C.

the polymeric binder or blend of polymeric binders has a glass transition temperature(s) of at least 360° C.

the polymeric binder or blend of polymeric binders has a glass transition temperature(s) of at least 400° C.

the adsorbent is selected from the group consisting of zeolite, activated carbon, carbon molecular sieve, activated alumina, silica gel, metalorganic frameworks, and amines in solid form.

the thermoplastic polymer is selected from the group consisting of polyetherimides, polyimides, polyamides, polyamide-imides, polyaramids, ladder-type polymers, polybenzimidazole (PBI), polybenzoxazole (PBO), and polybenzothiazole (PBT).

the thermoplastic polymer is selected from the group consisting of polybenzimidazole, polybenzoxazole, and polybenzothiazole.

the polymer dope suspension further comprises one or more types of cross-linking agents, and after formation by diffusion-induced phase separation, the polymeric matrix is caused to be cross-linked with the cross-linking agent(s).

after formation by diffusion-induced phase separation, the extrudates are impregnated with one or more types of cross-linking agents and the polymeric matrix is caused to be cross-linked with the cross-linking agent(s).

the polymer dope suspension further comprises one or more polymers insoluble in the solvent.

the soluble thermoplastic polymer and the insoluble polymer(s) have a same molecular formula but the insoluble polymer(s) has a higher molecular weight or degree of crystallinity.

one or more inorganic fillers are incorporated in the polymeric matrix.

the one or more inorganic fillers are selected from carbon fibers and glass fibers.

the polymeric matrix includes a one or more polyaramids and derivatives thereof.

the polymeric matrix includes a one or more polyaramids selected from MPD-I, MPD-IT, DAM-IT, and derivatives thereof.

the predetermined activation temperature is at least 220° C.

the predetermined activation temperature is at least 240° C.

the predetermined activation temperature is at least 250° C.

the predetermined activation temperature is at least 270° C.

the feed gas is separated by said one or more adsorbent beds by pressure swing adsorption.

the feed gas is syngas or a process gas from a syngas production process and the first gas is hydrogen.

the first gas is $CO_2$ and the second gas is $N_2$.

the first gas is $CO_2$ and the second gas is $CH_4$.

the feed gas is separated by said one or more adsorbent beds by temperature swing adsorption, the feed gas is air and the first gas is either water or $CO_2$.

the feed gas is air, the feed gas is separated by said one or more adsorbent beds by vacuum swing adsorption or vacuum-pressure swing adsorption, and either the first gas is oxygen and the second gas is nitrogen and or the first gas is nitrogen and the second gas is oxygen.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 1:
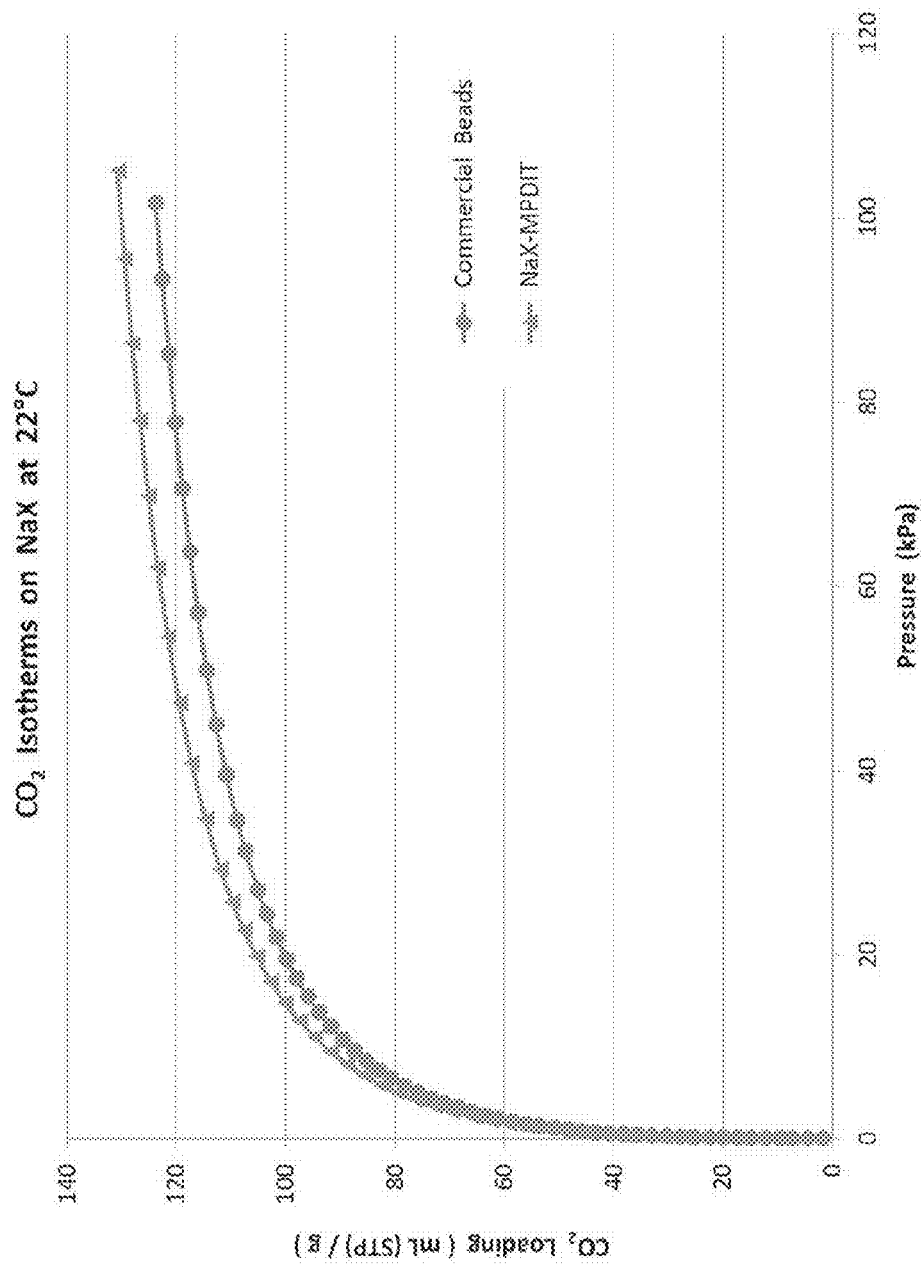
FIG. 1 is a graph of the $CO_2$ isotherms on 13X-MPDIT beads vs. the $CO_2$ isotherms for commercial beads.

We propose solid extrudates for sorbent-based fluid separations (i.e., adsorption-based or absorption-based) that are made of sorbent particles in a polymeric matrix that are made via diffusion-induced phase inversion or thermal-induced phase inversion. The extrudates are suitable for relatively high temperature activation and/or regeneration for adsorption-based fluid separation processes. More particularly, the polymeric matrix comprises a polymeric binder or blend of polymeric binders and can withstand exposure to activation or regeneration temperatures at or above 220° C. without significant detrimental effects upon the sorbent (such as adsorbent) capacity of the sorbent particles (hereinafter "heat exposure property"). The "heat exposure property" of the polymeric binder or blend of polymeric binders is defined as having a Vicat softening temperature ($T_s$), a heat deflection temperature (HDT), and/or a glass transition temperature ($T_g$) of at least 220° C. Typically, the $T_g$, HDT, and/or $T_s$ are all above the activation and regeneration temperature of the sorbent. Even more typically, one or more of these properties are at least 10° C. or even at least 20° C. higher than the activation and regeneration temperature of the sorbent. The polymeric binder or blend of polymeric binders typically withstand activation temperatures of at least 220° C., without significantly deteriorating the sorbent capacity of the sorbent particles for time periods of at least 1 hour, of at least 5 hours, or even as much as 10 hours (or more). After activation, typically the sorbent (such as adsorbent) particles have retained at least 95% of the sorbent (such as adsorbent) capacity.

The $T_s$ of a polymer may be determined according to the test procedure outlined in ASTM D 1525. ASTM D 1525 calls for measuring the temperature at which a flat-ended needle penetrates into a portion of the polymer being heated (in a controlled manner) to a specified depth.

The $T_g$ of a polymer is the temperature above which a polymer is in a rubbery state and below which a polymer is in its glassy state. Those of ordinary skill in the art will clearly recognize that the $T_g$ may be determined by differential scanning calorimetry (DSC) using a differential scanning calorimeter.

The HDT of a polymer may be determined according to the test procedure outlined in ASTM D648. ASTM D648 calls for application of an outer fiber stress, during testing, of either 0.45 MPa or 1.8 MPa and a controlled ramping up of temperature until a deflection of a given amount occurs.

The extrudates can have different shapes, including but not limited to, spherical, ovoid, tear-shaped, and cylindrical. Cylindrical extrudates may be distinguished from extruded fibers on the basis that such extrudates in a plurality of cylindrical extrudates are randomly arranged with respect to one another. Typically, the cylindrical extrudates have a non-limiting minimum outer diameter of at least 1 mm and a non-limiting length of around 10-20 mm. A non-limiting length to outer diameter ratio of the cylindrical extrudates typically ranges from 5:1 to 20:1.

The formulation may include one or more polymeric binders (either individually or as a whole) meeting the requisite heat exposure property. Those of ordinary skill in the art will recognize that the formulation may include two or more polymeric binders in which fewer than all of the polymeric binders have the requisite heat exposure property and one or more of the other binders do not have the requisite heat exposure property, but the blend of polymeric binders as a whole meet the requisite heat exposure property. For those polymeric binders that do not possess the requisite heat exposure property, it/they may be included in the formulation for reasons other than suitability for relatively high temperature activation and/or regeneration. For example, they may be included for their tensile strength or pore-forming properties.

The binder or blend of binders meeting the requisite heat exposure property are thermoplastic. A thermoplastic material is a resin that reversibly becomes plastic upon heating and hardens upon cooling. These materials may be distinguished from thermosetting materials which are resins that irreversibly cross-link upon heating, irreversibly cross-link upon application of other non-thermal energy, or irreversibly cross-link after chemical cross-linking with a cross-linker (also known as a curing agent).

Because they are made at least partially of a thermoplastic binder, the novel extrudates are highly satisfactory for use in sorbent processes operated with relatively fast cycle times, with relatively large sorbent beds, and/or with relatively high flow rates of gas to be treated. This is because the attrition velocity for thermoplastic binders is much higher than that of conventional beaded sorbents made from a relatively brittle, non-polymeric binder such as bentonite. More importantly, the novel extrudates are suitable or relatively high temperature activation and/or regeneration of the sorbent and do not soften, flow or thermally degrade during relatively high temperature activation and/or regeneration of the sorbent.

Phase inversion methods useful for forming the extrudates include diffusion induced phase separation (DIPS) and temperature induced phase separation (TIPS).

For extrudates manufactured by DIPS, the selected polymeric binder(s) is(are) are dissolved in a suitable solvent. Suitable solvents include those in which at least 98 wt % of the polymeric binder(s) dissolve. Depending on the polymeric binder(s) chosen and without limiting the scope of the invention, particular solvents include non-polar solvents, polar protic solvents as well as polar aprotic solvents. The latter include N-methyl-2-pyrrolidone (NMP), N,N-Dimethylformamide (DMF), N,N-Dimethylacetamide (DMAc), and N,N-Dimethylsulfoxide (DMSO), and combinations thereof. The solvent may also include an amount of a non-solvent (i.e., one that does not dissolve the polymeric binder(s)), but which is miscible with the solvent, in order to produce a single phase that is close to binodal. The composition of the polymeric binder(s) and solvent with sorbent particles is hereinafter referred to as a polymer dope.

The polymer dope may include one or more salts added to the solvent(s) in order to facilitate the polymer dissolution, such as $CaCl_2$ or LiCl. The combination of solvent(s) and salt(s) should also be selected with the nature of the sorbent used. For example, it may be desirable to include no salt with certain zeolites in order to prevent any ion exchange processes that would ultimately denature or transform the zeolite. On the other hand, salt(s) may be added so as to intentionally transform the zeolite by ionic exchange while in the polymer dope (made up of the polymeric binder(s), solvent(s), optional salts, sorbent, and optional filler). Alternatively, no salt may be intentionally added to the polymer dope but the formed composite-adsorbent extrudate may be subjected to further processing after formation, such as ion exchange in order to obtain the targeted adsorption properties. Such ion exchange processes are well known and maybe applied to the formed extrudate without significant modification due to the chemical inertness of the utilized polymer.

The polymer dope may include one or more organic and/or one or more inorganic fillers. One type of inorganic filler includes relatively short carbon fibers, such as 5-20 µm long, in amounts up to 20 wt % so as to increase the mechanical properties of the sorbent extrudates. An alternative filler is fiberglass. The organic fillers may be a polymer that is soluble or insoluble in the solvent of the polymer dope. The insoluble polymeric filler includes but is not limited to dry-spun fibrils made of a thermoplastic polymer. Examples of insoluble polymeric filler include poly(para-aramid) pulp or fibrils, (such as fibers made of Kevlar type 953 at a length of 500-1,000 µm). Inclusion of an insoluble poly(para-aramid) to a dissolved poly(meta-aramid) may allow the poly(para-aramid) to swell and thereby help to lock/entangle the poly(meta-aramid) and poly(para-aramid) polymers chains within one another while improving the mechanical properties of the sorbent extrudates. In order to enhance compatibility of blending insoluble polymeric fillers with the soluble thermoplastic polymer of the polymer dope, the insoluble polymeric filler typically belongs to the same general class of polymers as the dissolved thermoplastic polymer in the polymer dope. The insoluble polymeric filler may be identical to the soluble thermoplastic polymer of the polymer dope but have a higher molecular weight than that of the soluble thermoplastic polymer or have a higher degree of crystallinity than that of the soluble thermplastic polymer. For example, a high degree of crystallinity may be achieved with rigid-chain polymers such as in MPD-I fibers produced by dry spinning.

The polymer dope may include a cross-linking agent and cross-linking promoter in order to cross-link the polymeric binder(s) and to thereby increase the mechanical strength and/or the chemical resistance of the resultant extrudates. In such a case, the cross-linking reaction is performed after extrusion of the bead. One of ordinary skill in the art will recognize that any cross-linking agent known in the field of hollow fiber membranes may be used in the invention. Particular examples of cross-linking promoters include metal oxides and elemental, oligomeric, or polymeric sulfur. Alternatively, the polymer dope may include the cross-linking promoter but not the cross-linking agent. In such a case, the extruded bead may be exposed to the corresponding cross-linking agent by coating it with a composition including the cross-linking agent and subsequently cross-linking it.

Regardless of how the polymeric binder(s) is cross-linked, in a particular embodiment, cross-linking may be carried out on a relatively low molecular weight polymeric binder(s) instead of on a polymeric binder(s) having a molecular weight more typical of those used to form hollow fibers for gas separation membranes. In this manner, chain segments of such low molecular weight polymeric binder may be cross-linked in order to result in a cross-linked polymeric binder whose overall molecular weight more or less approximates those typically exhibited by polymeric binders used in forming hollow fibers for gas separation membranes.

This particular embodiment immediately above, where the thermoplastic binder in the solidified sorbent bead is cross-linked with a cross-linking agent and cross-linking promoter, may be distinguished from solidified adsorbent beads including a non-cross-linked thermosetting polymer. During relatively high temperature activation and/or regeneration of the adsorbent in such an adsorbent/thermosetting polymer matrix beads, the thermosetting polymer would be expected to cross-link during exposure to such relatively high temperatures. One of ordinary skill in the art will recognize that the structure and expected gas separation performance of a bed of such adsorbent/thermosetting polymer matrix adsorbent beads would be irreversibly changed. Thus, such a skilled artisan would not have any expectation that such a bed could be successfully used for the intended separation of fluids.

In an alternative to the inclusion of the already-polymerized polymeric binder (exhibiting the requisite heat exposure property) in the polymer dope, the polymer dope may include precursor(s) to the polymeric binder (where such polymeric binder would exhibit the requisite heat exposure property upon polymerization from the precursor(s)) and the intended polymeric binder is polymerized from the corresponding polymeric precursor during or after phase inversion.

In another alternative, instead of a polymeric binder(s) (exhibiting the requisite heat exposure property) having a molecular weight more typical of those used to form hollow fibers for gas separation membranes, the polymer dope may include a relatively low molecular weight polymeric binder(s) and its molecular weight is increased through heating (such as during activation of the extrudates) which promotes thermal cyclization reactions.

Some polymers may exhibit a satisfactory heat exposure property but have poor solubility in the solvent used in the polymer dope. For example, they may require dangerous solvents or solvents that are difficult to manage in view of environmental regulation, or they may be insoluble or only dissolve to an unsatisfactory extent and prevent bead formation through diffusion induced phase inversion. The three alternatives described immediately above (post-bead formation cross-linking, polymerization from precursors, and relatively low molecular weight polymeric binder(s)) provide a solution to this problem. This is because the polymer precursor or relatively low weight polymers are much more likely to exhibit satisfactory solubility in solvents typically used in fibers manufactured by phase inversion. Thus, the final polymeric binder (exhibiting the requisite heat exposure property) is ultimately caused to be present in the extrudates but there is no problem of dissolution of the polymeric or monomeric content in the polymer dope.

The dissolved polymeric binder(s) is then mixed with a sorbent in a powder form. The type of sorbent is not limited and may include any of those known to those skilled in the art of adsorption-based liquid or gas separation. Typically, the sorbent has a particle size of less than or equal to 100 µm, typically less than or equal to 10 µm, and sometimes even less than or equal to 1 µm. It may be milled in order to achieve the desired size distribution.

The polymer dope may optionally be degassed under heat and/or vacuum prior to extrusion through a die or spinneret. The polymer dope is forced through a die or spinneret into a coagulant medium where the solvent(s) is removed from the polymer dope thus inducing the polymer matrix to solidify. The polymeric binder loading and amount of solvent are carefully controlled in order to produce a single phase that is close to binodal. That way, as the ejected bore fluid and extruded spin dope composition exit the spinneret and traverse through an optional air gap, solvent evaporating from the core spin dope composition either causes the exterior of the dope solution to solidify or brings it closer to solidification.

The coagulation bath (also known as the coagulant) constitutes a non-solvent or a poor solvent for the polymer while at the same time a good solvent for the solvent within the core spin dope composition. As the nascent bead plunges into a coagulant bath containing non-solvent, exchange of solvent and non-solvent from the bead to the bath and vice-versa completes the solidification of the bead to form a two-phase sub-structure of solid polymer and liquid solvent/non-solvent. In this manner, the liquid coagulant bath facilitates phase inversion (i.e., solidification) of the polymer dope polymer. In selecting an appropriate coagulant medium composition and temperature, the nature of the polymer dope may be considered. After coagulation, the resulting sorbent/polymer matrix can be best described as an opened-cell structure. Specifically, the polymer matrix encapsulates the sorbent particulates in an opened-cell structure or cage structure, without sticking to the sorbent particles so as to promote good mass transport.

As seen above, the thermoplastic polymer of the polymeric binder or blend of polymeric binders (exhibiting the requisite heat exposure property) must be soluble in a solvent suitable for formation into extrudates via DIPS. Alternatively, the polymeric binder in the resultant extrudates must be able to be formed from its constituent precursor (via chain-lengthening as explained above) or monomers (via polymerization) after extrusion where the constituent precursor or monomers itself/themselves are soluble in a solvent suitable for formation into extrudates via DIPS. We have found that many polymers exhibiting the required heat exposure property are not soluble enough to allow them to be formed by DIPS. Conversely, many polymers soluble enough to allow them to be formed by DIPS do not exhibit the required heat exposure property.

Now that DIPS has been described, we will proceed to describe formation of the bead by TIPS.

Those skilled in the art will understand that the extrudates may be formed by TIPS by heating a composition of the sorbent particles and the polymeric binder(s) or blend of polymeric binder(s) (hereinafter referred to as a polymer dope) above the melting temperature of the polymeric binder, or in the case of two or more polymeric binders, above the melting temperature of the highest-melting point polymeric binder in the formulation. The blend of sorbent and molten polymeric binder is then extruded through a die or spinneret and the nascent bead is allowed to traverse through a cooling medium such as water and/or air so that the nascent bead solidifies. Because there is no need to dissolve the polymeric binder(s) in the formulation, there is no need for a solvent. Non-melting additives (from those described above) may be included in the formulation. By non-melting, we mean that they have a melting point higher than the temperature to which the formulation is heated and remain in a solid state during extrusion from the spinneret. Examples of non-melting additives include the fillers described above for the polymer dope for DIPS.

Whether the extrudates are formed by DIPS or TRIPS, the extrudates may be placed (e.g., as a bed of sorbent extrudates) within a vessel for performing adsorption-based separation of fluids, such as for separation of gases (either in vapor/gas phase or gas/gas phase. The type of adsorption-based separation process is not limited and includes pressure swing adsorption (PSA), temperature swing adsorption (TSA), vacuum swing adsorption (VSA), vacuum-pressure swing adsorption (VPSA), and electric swing adsorption (ESA). Such structures and processes may be stationary or mobile. While the structure used for adsorption-base separation is typically used for gas separations, it may also be used for vapor separations or condensed phase separations.

Multiple polymers or families of polymers may be considered for use as either the polymeric binder having the requisite heat exposure property or in a blend of polymers whose combination exhibits the requisite heat exposure property, including polyetherimides, polyimides, polyamides, polyamide-imides, polyaramids, ladder-type polymers, polybenzimidazole (PBI), polybenzoxazole (PBO), and polybenzothiazole (PBT). A particularly suitable example of a polyimide is the polymer of formula (I) that is commercially available from Evonik Fibres GmbH under the trademark P84®.

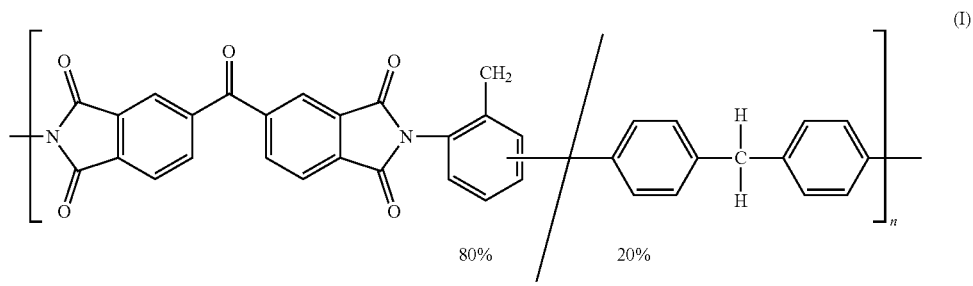

P84 has a reported $T_g$ of 315° C. Another particularly suitable polyimide is commercially available from Evonik Fibres GmbH under the trademark P84® NT. P84® NT has a reported $T_g$ of 337° C. and an HDT of 319-343° C.

Polyamide-imides exhibit satisfactory solubility in a variety of ordinary solvents and retain their toughness, high strength and high stiffness generally up to 275° C. A particularly suitable example of a polyamide-imide is the polymer of formula (II) that is commercially available from Solvay under trade name Torlon®. For example, one particular type of Torlon® (4203L) has an HDT of 278° C. (ASTM D648) and a $T_g$ of 277° C. The structure of Torlon is according to formula (II):

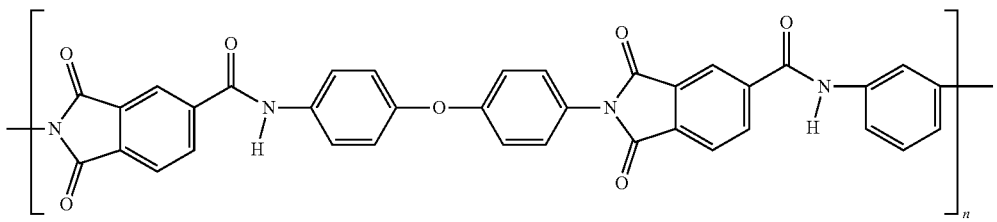

Particularly suitable polyaramids include meta-aramids, examples of which include: MPD-I (poly m-phenylene isophthalamide) or MPD-IT (the condensation polymerization product of m-phenylenediamine (MPD), isophthaloyl chloride (I) and terephthaloyl chloride (T)). MPD-I is commercially available from DuPont under the trademark Nomex® and has the structure according to formula (III):

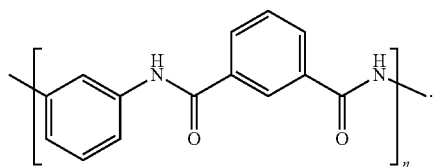

(III)

We have measured a Tg for MPD-IT of about 275° C.

PBI (poly[2,2'-(m-phenylen)-5,5'-bisbenzimidazole]) may be used by itself or in a blend of other polymeric binders to increase the heat exposure property of the other polymeric binders. For instance, without limiting the scope of the invention, PBI can be blended with polyetherimide (PEI) or polyamide-imide (PAI) so as to increase PEI's or PAI's $T_g$. The structure of PBI is according to formula (IV):

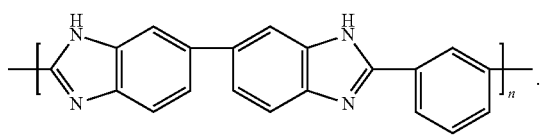

(IV)

PBI has exceptional thermal and chemical stability and it exhibits an HDT of about 435° C. at 1.8 MPa as well as a $T_g$ of 427° C. and can be exposed to temperatures up to 540° C. PBI does not melt but degrades around 760° C. under pyrolysis. Given its relatively low elongation at breaks (3%), PBI alone, or with a filler, is well suited for extrudates that require relatively little flexibility. Its thermal stability makes it a prime choice for $O_2$ VSA using lithium based zeolite which requires activation temperatures in excess of 400° C.

PBO (poly(p-phenylene-2,6-benzoxazole)) has the structure according to formula (V):

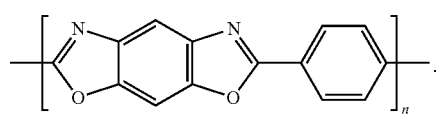

(V)

PBT (poly(p-phenylene-2,6-benzothiazole)) has the structure according to formula (VI):

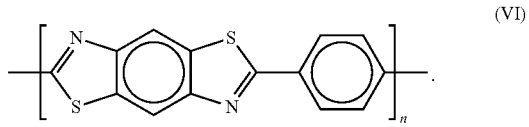

(VI)

Examples of ladder-type polymers include benzimidazobenzo-phenanthroline-type ladder polymer (BBL) and its derivatives (e.g. BBL-N, BBL-P, BBL-DBF, BBL-AQ), polyhydroquinoxaline structures and semi-ladder polybenzimidazobenzophenanthroline (BBB). BBL has the structure according to formula (VII):

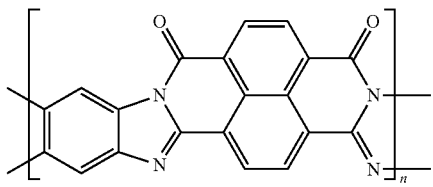

(VII)

As mentioned above, blends of polymeric binders may be envisioned for different purposes. Specifically, blends of polymers can be formulated so as to better tune the final polymer matrix properties. As previously mentioned, high-temperature rated polymers (such as PBI or the like) can be added to increase the thermal performance of a lower temperature rated thermoplastic polymer. For instance, 50 wt % PBI can be used in PAI so as to increase the $T_g$ of PAI. Alternatively, permeable polymers can be added to relatively non-permeable polymers so as to improve gas diffusion across polymeric regions within the polymeric binder/sorbent matrix. For instance, 20 wt % DAM-IT can be used in MPD-IT to favor gas transport as MPD-IT can be impermeable to gases.

The sorbent particles in the extrudates include any of those known in the field of sorbent-based fluid separation (i.e., adsorption-based or absorption-based), and in particular, gas separation. Non-limiting types of adsorbents includes zeolites (e.g., types A, Y, X, CaBaX, or LSX such as Li-LSX, Ca-LSX), activated carbon, carbon molecular sieve, activated alumina, silica gel, metallorganic frameworks (MOF) and amines in solid form. By amines in solid form, we mean amines that have been deposited upon a solid substrate or solid particles of amines that are not supported on a substrate.

In the case of adsorption-based fluid separations, the extrudates may be formed as a discrete adsorbent bed. The adsorbent bed may be a stationary one or a mobile one (such as in On Board Oxygen Generation Systems or OBOGS). The adsorption-based fluid separation process may use the adsorbent bed as a non-fluidized bed, as a fluidized bed, or as a circulating bed. The adsorption process may be pressure swing adsorption (PSA), pressure-temperature swing adsorption (PTSA), temperature swing adsorption (TSA), vacuum swing adsorption (VSA), vacuum-pressure swing adsorption (VPSA), electro swing adsorption (ESA), rapid cycle pressure swing adsorption (RCPSA), or rapid cycle temperature swing adsorption (RCTSA). In a PSA process, particular non-limiting examples of a gas separation process performed using the adsorbent bed include purification of H2 (particularly for obtaining H2 from syngas or a syngas process gas such as one primarily containing H2, CO, N2, and CH4), for N2 capture from air, for CO2 removal from N2, and CO2 removal from CH4. In a TSA process, particular non-limiting examples of gas separation processes performed using the adsorbent bed includes de-humidification of air and de-carbonation of air such as in an air separation unit (such as in the front end purification unit of a cryogenic distillation-based ASU). The adsorbent bed may also be used in a VSA or VPSA process for capture of N2 capture from air to produce O2. One particular separation process is the front end purification (FEP) process for purification of air for feeding to a cryogenic distillation-based air separation unit (ASU) where amounts of CO2, H2O, and volatile organic compounds (VOCs) are removed from air to produce a feed for the ASU. The adsorbent bed may also be used for separation of liquids, such as condensed gases. Also, the adsorbent may be used for separation of vapors.

The invention exhibits several advantages.

The present invention results in sorbent structures that are relatively attrition resistant or dusting free. By using a polymeric binder or blend of polymeric binders, significant advantages over traditional clay-based binders are gained. Traditional clay-based binders are brittle and prone to dusting. In contrast, polymeric binders are more forgiving in terms of mechanical as well as thermal stress and provide great flexibility in forming, handling and operating methods. For instance, considering sorbent extrudates with a polymeric binder, dusting can be eliminated or significantly reduced so that process schemes with circulating or fluidized sorbent beds can be envisioned. In comparison to conventional inorganic binder-based adsorbent beads having a rated attrition velocity (beyond which such conventional beads become too attrited and cause undesirably high amounts of dusting), the extrudates of the invention may be subjected to gas flow velocities above such rated attrition velocities for conventional inorganic binder-based adsorbent beads. The invention also provides greater flexibility with regard to activation temperatures. Because of their heat exposure property, they may withstand relatively high activation temperatures that prior art beads cannot handle without suffering significant decreases in the adsorbent capacity.

The invention may be contrasted with the prior solutions.

In the past, multiple polymeric binders have been proposed to form various adsorbent structures. For instance, U.S. Pat. No. 6,451,723 discloses the use of polysulfone (PSU) to form mix-matrix 13X-PSU adsorbent structures. However, polysulfone (PSU) comes with a heat deflection temperature (HDT) of only 174° C. at 1.8MPa and a glass transition temperature (Tg) of 185° C. These two parameters are important figures to look at—among others—as they offer insights on how the resulting adsorbent bed structures will handle mechanical load under temperature. Specifically, the HDT is the temperature at which a polymer sample deforms under a specified mechanical load. Indeed, as a thermoplastic polymer is exposed to increasing temperatures, its mechanical properties can weaken more or less abruptly close to the glass transition temperature ($T_g$). Regarding the latter, it is highly desirable to stay under the glass transition temperature of a given polymer in order to avoid/mitigate a collapse of the pore structures. Such a collapse will have detrimental impact on both adsorbent capacity and kinetics, especially when using impermeable polymers such as polyaramids.

U.S. Pat. No. 8,133,308 proposes to form a supported sorbent fiber. Specifically, a thin layer of a matrix adsorbent—cellulose acetate is deposited on the outside diameter of a non-sorbent hollow fiber. However, cellulose acetate (CA) comes with a heat deflection temperature (HDT) of only 86° C. at 1.8MPa and 105° C. at 0.45MPa as well as a glass transition temperature (Tg) of 130° C.

The foregoing described prior art-proposed thermoplastic polymers exhibit relatively low $T_g$'s and are therefore not suitable for high-temperature activation/regeneration (e.g. >250° C.). In addition, considering large structured adsorbent systems of several cubic meters, the properties of the selected polymer as well as the constraints related to forming becomes critical as one has to look for additional key parameters (e.g. HDT, impact resistance) that are of no concern when making small size adsorbent structures (e.g. of a few liters).

U.S. Pat. No. 7,592,284 discloses the use of multiple generic polymer families, including thermoset and thermoplastic polymers. Thermoset polymers are typically obtained from a thermosetting resin, a pre-polymer in a soft solid or viscous state, which changes irreversibly into an infusible, insoluble polymer network by curing. During the curing, cross-linking reactions occur resulting in the forming of a rigid three dimensional polymeric structure. Curing can be induced by the action of heat. In contrast, the inventive extrudates do not thermally cross-link in the absence of a cross-linking agent and optional cross-linking promoter.

Although thermoset polymers generally speaking are better suited for high temperature requirements, the tuning of the resulting porosity can be challenging. One of ordinary skill in the art will recognize that too low of a porosity can create a bottleneck to diffusion of fluids (such as gases) through the thermoset polymer. In other words, a low flux of fluid through the binder to the adsorbent particles will decrease the productivity of the separation at hand. Thermoset polymers can also emit VOCs, even after curing, which can be an issue for front end purification (FEP) processes upstream of cryogenic processes as undesirable VOCs will condensate and accumulate on heat exchangers. Chemical resistance as well as impact resistance can also be a problem with thermoset polymers which can be brittle and therefore crack under mechanical or thermal stress. Such a scenario would negatively impact the performance of a monolithic bed as cracks would create preferential paths for the gas, thus leading to an early breakthrough.

In contrast to prior art solutions, the invention provides a solution of activation of many sorbents having a high temperature activation. For example, some applications such as LiX based zeolite for $N_2/O_2$ separation or $CO_2$ capture using NaX zeolite typically requires high temperature activations. For instance, LiX based zeolite can require activation up to 450° C. while NaX zeolite can require 330° C. activation so as to reach the full sorbent capacity. The inventive extrudates not only accommodate high temperature requirements but also guarantee the structural and mechanical integrity of sorbent systems.

Considering a 300° C. regeneration event on an axial-flow-configured TSA of an ASU, heat is brought to the bed from say the top of the bed and the temperature is measured/ monitored at the other end of the bed, in this case, the bottom. Depending on the heat ramp protocol, the top end of the bed can be subjected to hours-long high-heat events while the bottom end may see shorter high-heat events. Therefore, the inventive extrudates provide an sorbent system solution that exhibits high-heat resistance over several hours and will withstand long enough the necessary activation/regeneration temperature.

EXAMPLES

Example 1

High temperature adsorbent beads were prepared by dissolving MPD-IT (at 20 wt %) in NMP solvent without salt using a high speed mixer and then let degassed. Next, a commercially available adsorbent powder of sodium based 13X zeolite was added to the dope so that once coagulated, the adsorbent beads would be loaded with 87 wt % of zeolite. The resulting beads were then washed in methanol, air dried at room temperature and finally activated at 275° C. A $CO_2$ isotherm was generated and compared to a benchmark $CO_2$ isotherm obtained from commercial (i.e., conventional) beads (which were activated at 330° C.). As seen in FIG. 1, the $CO_2$ isotherm of the beads of Example 1 compares quite favorably to that of conventional beads.

Example 2

Figure 2:
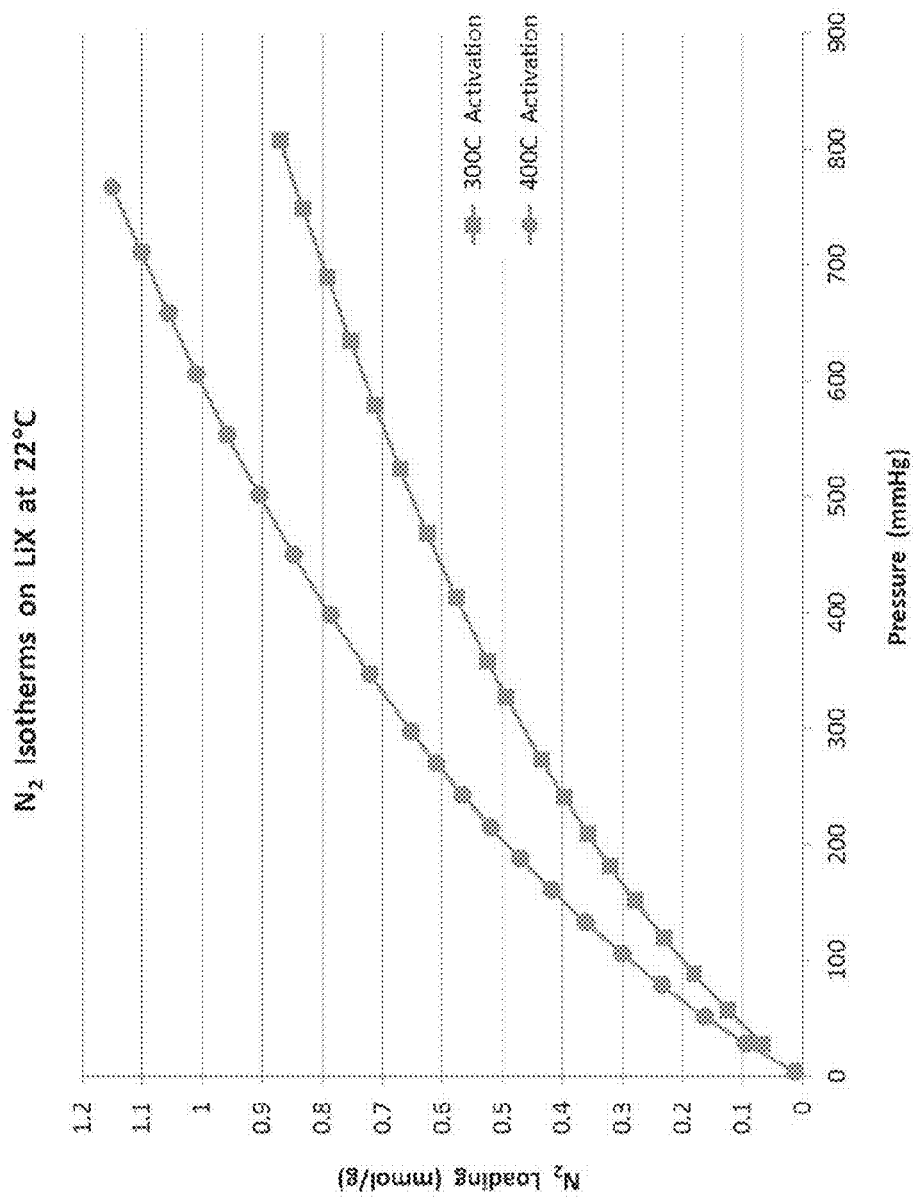
FIG. 2 is a graph of the $N_2$ isotherms on LiX-PBI beads after 300° C. & 400° C.

High temperature adsorbent beads were prepared by dissolving PBI (at 15 wt %) in DMAc solvent without salt. Next, adsorbent powder of sodium based 13X zeolite commercially available was added to the dope using a high speed mixer and then degassed. The PBI was added in amounts so that, once coagulated, the adsorbent beads would be loaded with 88 wt % of zeolite. The resulting beads were then washed multiple times in deionized water charged with a lithium salt so as to transform the NaX into LiX zeolite. Finally, the beads were washed in methanol, air dried at room temperature and activated at 300° C. and at 400° C. A first $N_2$ isotherm was carried out (at 22° C.) after the 300° C. activation step and a second $N_2$ isotherm was carried out (at 22° C.) after the 400° C. activation step. As seen in FIG. 2, high temperature activation helps to reach the full $N_2$ capacity of the LiX zeolite.

What is claimed is:

1. A bed of composite extrudates for sorbent-based fluid separations each of which comprises sorbent particles in a polymeric matrix, wherein:
   the polymeric matrix comprises a polymeric binder or blend of polymeric binders;
   the polymeric binder or blend of polymeric binders comprises at least one thermoplastic polymer;
   the polymeric binder or blend of polymeric binders is able to withstand exposure to temperatures at or above 220° C. without significant detrimental effect upon the sorbent capacity of the sorbent particles;
   said extrudates having been produced by temperature-induced phase separation (TIPS) or diffusion-induced phase inversion (DIPS) from a polymer dope suspension that comprises the thermoplastic polymer, optionally dissolved in a solvent in the case of DIPS, and the sorbent particles either suspended in the solvent in the case of DIPS or suspended in thermoplastic polymer while in the molten state in the case of TIPS;
   the sorbent is an adsorbent or absorbent; and
   the sorbent particles are present in the extrudates at a concentration of at least 50 wt %.

2. The extrudates of claim 1, wherein the polymeric binder or blend of polymeric binders has a Vicat softening temperature or a heat deflection temperature of at least 220° C.

3. The extrudates of claim 1, wherein the polymeric binder or blend of polymeric binders has a Vicat softening temperature or a heat deflection temperature of at least 240° C.

4. The extrudates of claim 1, wherein the polymeric binder or blend of polymeric binders has a Vicat softening temperature or a heat deflection temperature of at least 250° C.

5. The extrudates of claim 1, wherein the polymeric binder or blend of polymeric binders has a Vicat softening temperature or a heat deflection temperature of at least 270° C.

6. The extrudates of claim 1, wherein the polymeric binder or blend of polymeric binders has a Vicat softening temperature or a heat deflection temperature of at least 300° C.

7. The extrudates of claim 1, wherein the polymeric binder or blend of polymeric binders has a Vicat softening temperature or a heat deflection temperature of at least 330° C.

8. The extrudates of claim 1, wherein the polymeric binder or blend of polymeric binders has a Vicat softening temperature or a heat deflection temperature of at least 360° C.

9. The extrudates of claim 1, wherein the polymeric binder or blend of polymeric binders has a Vicat softening temperature or a heat deflection temperature of at least 400° C.

10. The extrudates of claim 1, wherein the polymeric binder or blend of polymeric binders has a glass transition temperature(s) of at least 220° C.

11. The extrudates of claim 1, wherein the polymeric binder or blend of polymeric binders has a glass transition temperature(s) of at least 240° C.

12. The extrudates of claim 1, wherein the polymeric binder or blend of polymeric binders has a glass transition temperature(s) of at least 250° C.

13. The extrudates of claim 1, wherein the polymeric binder or blend of polymeric binders has a glass transition temperature(s) of at least 260° C.

14. The extrudates of claim 1, wherein the polymeric binder or blend of polymeric binders has a glass transition temperature(s) of at least 270° C.

15. The extrudates of claim 1, wherein the polymeric binder or blend of polymeric binders has a glass transition temperature(s) of at least 300° C.

16. The extrudates of claim 1, wherein the polymeric binder or blend of polymeric binders has a glass transition temperature(s) of at least 330° C.

17. The extrudates of claim 1, wherein the polymeric binder or blend of polymeric binders has a glass transition temperature(s) of at least 360° C.

18. The extrudates of claim 1, wherein the polymeric binder or blend of polymeric binders has a glass transition temperature(s) of at least 400° C.

19. The extrudates of claim 1, wherein the adsorbent is selected from the group consisting of zeolite, activated carbon, carbon molecular sieve, activated alumina, silica gel, metalorganic frameworks, and amines in solid form.

20. The extrudates of claim 1, wherein the thermoplastic polymer is selected from the group consisting of polyetherimides, polyimides, polyamides, polyamide-imides, polyaramids, ladder-type polymers, polybenzimidazole (PBI), polybenzoxazole (PBO), and polybenzothiazole (PBT).

21. The extrudates of claim 1, wherein the thermoplastic polymer is selected from the group consisting of polybenzimidazole, polybenzoxazole, and polybenzothiazole.

22. The extrudates of claim 1, wherein the polymer dope suspension further comprises one or more types of cross-linking agents, and after formation by diffusion-induced phase separation, the polymeric matrix is caused to be cross-linked with the cross-linking agent(s).

23. The extrudates of claim 1, wherein after formation by diffusion-induced phase separation, the extrudates are impregnated with one or more types of cross-linking agents and the polymeric matrix is caused to be cross-linked with the cross-linking agent(s).

24. The extrudates of claim 1, wherein the polymer dope suspension further comprises one or more polymers insoluble in the solvent.

25. The extrudates of claim 24, wherein the soluble thermoplastic polymer and the insoluble polymer(s) have a same molecular formula but the insoluble polymer(s) has a higher molecular weight or degree of crystallinity.

26. The extrudates of claim 1, further comprising one or more inorganic fillers incorporated in the polymeric matrix.

27. The extrudates of claim 26, wherein the one or more inorganic fillers are selected from carbon fibers and glass fibers.

28. The extrudates of claim 1, wherein the polymeric matrix includes a one or more polyaramids and derivatives thereof.

29. The extrudates of claim 1, wherein the polymeric matrix includes a one or more polyaramids selected from MPD-I, MPD-IT, DAM-IT, and derivatives thereof.

30. A method for activation of the extrudates of claim 1, comprising the step of heating the extrudates to a predetermined activation temperature of the sorbent.

31. The method of claim 30, wherein the predetermined activation temperature is at least 220 C.

32. The method of claim 30, wherein the predetermined activation temperature is at least 240 C.

33. The method of claim 30, wherein the predetermined activation temperature is at least 250 C.

34. The method of claim 30, wherein the predetermined activation temperature is at least 270 C.

35. An adsorbent bed for adsorption-based fluid separations comprising a plurality of the extrudates activated by the method of claim 30.

36. Method for adsorption-based gas separation, comprising the step of separating a feed gas, including at least first and second gases, with one or more of the adsorbent beds of claim 35 to produce a first stream of gas that is enriched in the first gas in comparison to the feed gas and a second stream of gas that is enriched in the second gas in comparison to the feed gas, wherein the feed gas is separated by said one or more adsorbent beds by pressure swing adsorption, pressure-temperature swing adsorption, temperature swing adsorption, vacuum swing adsorption, vacuum-pressure swing adsorption, or electro swing adsorption.

37. The method of claim 36, wherein the feed gas is separated by said one or more adsorbent beds by pressure swing adsorption.

38. The method of claim 37, wherein the feed gas is syngas or a process gas from a syngas production process and the first gas is hydrogen.

39. The method of claim 37, wherein the first gas is $CO_2$ and the second gas is $N_2$.

40. The method of claim 37, wherein the first gas is $CO_2$ and the second gas is $CH_4$.

41. The method of claim 36, wherein the feed gas is separated by said one or more adsorbent beds by temperature swing adsorption, the feed gas is air and the first gas is either water or $CO_2$.

42. The method of claim 36, wherein the feed gas is air, the feed gas is separated by said one or more adsorbent beds by vacuum swing adsorption or vacuum-pressure swing adsorption, and either the first gas is oxygen and the second gas is nitrogen and or the first gas is nitrogen and the second gas is oxygen.

* * * * *